(12) United States Patent
Kawaguchi et al.

(10) Patent No.: US 10,707,666 B2
(45) Date of Patent: Jul. 7, 2020

(54) CLAMP AND WIRE HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Tomoya Kawaguchi, Yokkaichi (JP); Yuichi Kimoto, Yokkaichi (JP)

(73) Assignees: AUTONETWORKS TECHNOLOGIES, LIMITED, Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/497,834

(22) PCT Filed: Mar. 23, 2018

(86) PCT No.: PCT/JP2018/011708
§ 371 (c)(1),
(2) Date: Sep. 26, 2019

(87) PCT Pub. No.: WO2018/180989
PCT Pub. Date: Oct. 4, 2018

(65) Prior Publication Data
US 2020/0169071 A1 May 28, 2020

(30) Foreign Application Priority Data
Mar. 30, 2017 (JP) .................................. 2017-067432

(51) Int. Cl.
*H02G 3/32* (2006.01)
*H02G 3/04* (2006.01)
(Continued)

(52) U.S. Cl.
CPC ............ *H02G 3/32* (2013.01); *B60R 16/0215* (2013.01); *H01B 7/0045* (2013.01); *H02G 3/0468* (2013.01)

(58) Field of Classification Search
CPC ...... H02G 3/0468; H02G 3/32; H01B 7/0045; B60R 16/0215
See application file for complete search history.

(56) References Cited

U.S. PATENT DOCUMENTS 4,361,937 A * 12/1982 Davis .................. E21B 17/1035
174/47
10,279,756 B2 * 5/2019 Hayakawa .......... B60R 16/0215
(Continued)

FOREIGN PATENT DOCUMENTS

JP 2010-283965 A 12/2010
JP 2011-155763 A 8/2011
(Continued)

OTHER PUBLICATIONS

May 15, 2018 International Search Report issued in International Patent Application No. PCT/JP2018/011708.

*Primary Examiner* — Timothy J Thompson
*Assistant Examiner* — Amol H Patel
(74) *Attorney, Agent, or Firm* — Oliff PLC

(57) ABSTRACT

A wire harness 10 has a sheathing material 21 that is flexible and covers wires 11, a path-regulating member 31 for regulating a path along which the wires 11 are arranged from outside of the sheathing material 21, the path-regulating member 31 having an axial direction parallel to the path along which the wires 11 are arranged, and an intermediate
(Continued)

clamp 41. The intermediate clamp 41 has a support portion 51 for supporting the path-regulating member 31, and an attachment portion 61 with a ring-shaped structure for attaching the sheathing material 21. The attachment portion 61 has an insertion portion 62 that enables the sheathing material 21 to be inserted therefrom in a radial direction of the ring-shaped structure. The attachment portion 61 can be changed between an open orientation that enables the sheathing material to be inserted from the insertion portion 62, and a closed orientation that makes the ring-shaped structure into a continuous ring shape. The closed orientation is formed by locking structures, which include a first locking structure 63 and a second locking structure 64 that are arranged separately from each other in the axial direction of the ring-shaped structure.

5 Claims, 3 Drawing Sheets

(51) Int. Cl.
*B60R 16/02* (2006.01)
*H01B 7/00* (2006.01)

(56) References Cited

U.S. PATENT DOCUMENTS

| 2016/0114743 | A1* | 4/2016 | Miyamoto | F16L 3/1025 |
| | | | | 224/557 |
| 2018/0350486 | A1* | 12/2018 | Egami | H01B 7/0045 |
| 2019/0036314 | A1* | 1/2019 | Toll | H02G 3/32 |
| 2019/0170272 | A1* | 6/2019 | Sims | F16L 3/137 |
| 2020/0059075 | A1* | 2/2020 | Rouleau | H02G 3/32 |
| 2020/0072392 | A1* | 3/2020 | Foerg | F16L 3/06 |

FOREIGN PATENT DOCUMENTS

| JP | 2014-90579 A | 5/2014 |
| WO | 2012/070266 A1 | 5/2012 |
| WO | 2013/061623 A1 | 5/2013 |
| WO | 2017/213008 A1 | 12/2017 |

* cited by examiner

US 10,707,666 B2

CLAMP AND WIRE HARNESS

BACKGROUND

The present disclosure relates to a clamp and a wire harness.

As disclosed in JP 2011-155763A, a wire harness is known that includes a frame member for regulating a path along which wires are laid out from the outside of a corrugated tube for protecting the wire.

SUMMARY

As mentioned above, the path of wires protected by a flexible sheathing material, such as a corrugated tube, can be regulated by connecting the sheathing material to a path-regulating member (frame member). Clamps, which are used to connect the path-regulating member to the sheathing material, have an attachment portion with a ring-shaped structure for attaching the sheathing material. If the sheathing material is attached to the attachment portion by inserting the sheathing material thereinto in the radial direction of the ring-shaped structure of the attachment portion, there is concern that the sheathing material will withdraw from the attachment portion. If the sheathing material withdraws from the attachment portion of a clamp, regulation of the path of the sheathing material by the path-regulating member is cancelled, and for example, there is concern that the sheathing material will come into contact with the ground or the like.

An exemplary aspect of the disclosure provides a clamp and a wire harness that are capable of making the regulation of the path of the sheathing material using the path-regulating member more reliable.

A clamp according to an exemplary aspect is a clamp that is to be used as a constituent member of a wire harness, the wire harness including wires, a sheathing material that is flexible and covers the wires, and a path-regulator for regulating a path along which the wires are laid out from outside the sheathing material, the path-regulator having an axial direction parallel to the path along which the wires are laid out, the clamp including: a support for supporting the path-regulator; and an attachment with a ring-shaped structure for attaching the sheathing material, wherein the attachment has an insertion that enables the sheathing material to be inserted therefrom in a radial direction of the ring-shaped structure, the attachment can be changed between an open orientation that enables the sheathing material to be inserted from the insertion, and a closed orientation that makes the ring-shaped structure into a continuous ring shape, and the clamp is provided with locks configured to keep the attachment in the closed orientation, the locks including a first lock and a second lock that are arranged separately from each other in an axial direction of the ring-shaped structure.

According to this configuration, even if locking at either the first lock or the second lock is released when the attachment of the clamp is used in the closed orientation with the sheathing material attached thereto, the sheathing material does not withdraw from the attachment of the clamp.

If is preferable that the sheathing material has a ring-shaped recess in an outer-circumferential face thereof, and an inner-circumferential face of the ring-shaped structure of the attachment has a protrusion that is to be fitted to the ring-shaped recess of the sheathing material.

According to this configuration, the sheathing material is restrained from moving in the axial direction thereof relative to the attachment of the clamp. Accordingly, the path of the sheathing material is preferably regulated by the path-regulator that is supported by the support of the clamp.

If is preferable that the first lock and the second lock are provided at positions biased toward the support relative to an outer-circumferential end edge located at a position farthest from the support, in an outer-circumferential edge of the ring-shaped structure of the attachment, when viewed from the axial direction of the ring-shaped structure of the attachment in the closed orientation.

According to this configuration, for example, it is difficult for other members to hook on the first lock and the second lock and thus, it is difficult for the locking at the first lock and the second lock to be released.

It is preferable that the first lock, the support and the second lock are arranged, in that order, in a direction parallel to the axial direction of the ring-shaped structure of the attachment.

By thus arranging the first lock and the second lock of the attachment relative to the support in a well-balanced manner, for example, stress concentration can be reduced when force is applied from the path-regulator and/or the sheathing material to the clamp.

A wire harness according to an exemplary aspect includes: wires; a sheathing material that is flexible and covers the wires; a path-regulator for regulating a path along which the wires are laid out from outside the sheathing material, the path-regulator having an axial direction parallel to the path along which the wires are laid out; and a clamp having a support for supporting the path-regulator, and an attachment with a ring-shaped structure for attaching the sheathing material, wherein the attachment of the clamp has an insertion that enables the sheathing material to be inserted therefrom in a radial direction of the ring-shaped structure, the attachment can be changed between an open orientation that enables the sheathing material to be inserted from the insertion, and a closed orientation that makes the ring-shaped structure into a continuous ring shape, and the clamp is provided with locks configured to keep the attachment in the closed orientation, the locks including a first lock and a second lock that are arranged separately from each other in an axial direction of the ring-shaped structure.

According to the present disclosure, regulation of the path of the sheathing material using the path-regulator can be made more reliable.

DETAILED DESCRIPTION OF EMBODIMENTS

An embodiment of a clamp and a wire harness will be described below.

Figure 1:
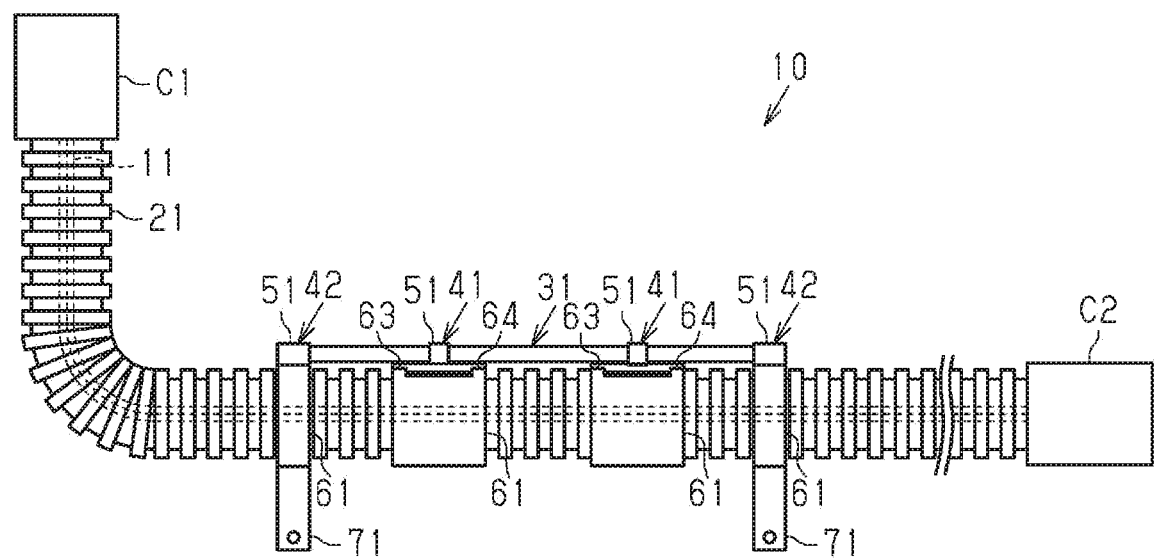
FIG. 1 is a schematic plan view that shows a wire harness according to an embodiment.

As shown in FIG. 1, a wire harness 10 includes wires 11, a sheathing material 21 that is flexible and covers the wires 11, a path-regulating member 31 (path regulator) for regulating a path along which the wires 11 are laid out from the outside of the sheathing material 21, intermediate clamps 41 for supporting intermediate portions of the path-regulating member 31, and end clamps 42 for supporting end portions of the path-regulating member 31.

Layout

Figure 2:
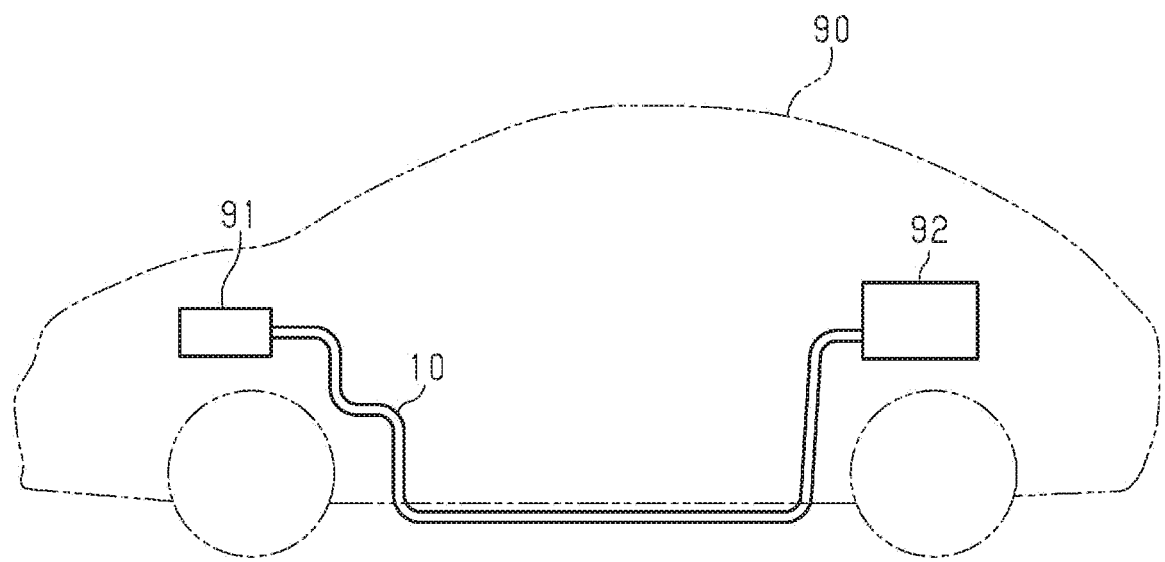
FIG. 2 is a schematic diagram that shows a layout of the wire harness in a vehicle.

As shown in FIG. 2, the wire harness 10 is used to electrically connect a first device 91 and a second device 92, which are mounted in a vehicle 90, to each other. The first device 91 is arranged on the front side of the vehicle 90. The second device 92 is arranged on the rear side of the vehicle 90. For example, one of the first device 91 and the second device 92 is a battery, and the other one is an inverter. Note that, alternatively, one of the first device 91 and the second device 92 may be a motor, and the other one may be an inverter. Examples of the vehicle 90 may include an electric vehicle, a hybrid vehicle, a fuel cell vehicle, and the like. The wire harness 10 according to this embodiment is laid out in an underfloor portion of the vehicle 90.

Wires 11

Each of the wires 11 has a core wire, which is conductive, and an insulating coating, which is insulative. The core wire is made of a conductive material, such as copper or aluminum, for example. The core wire is constituted by one or more elemental wires. The insulating coating is made of an insulating material, such as polyvinyl chloride, and is formed to have a tubular shape, as is known well.

Two end portions of each wire 11 are constituted by respective connector portions C1 and C2. The wires 11 are high-voltage wires, and are electrically connected to input-output terminals of the first device 91 and the second device 92 that are mounted in the vehicle 90. The rated voltage of high-voltage wires for a vehicle exceeds 30 V in the case of AC voltage, and exceeds 60 V in the case of DC voltage. Note that the rated voltage of high-voltage wires for a vehicle is 600 V at the most in the case of AC voltage, and is 750 V at the most in the case of DC voltage.

The wires 11 may also include a shielding material for shielding the wires 11 from electromagnetic waves, or a shielding material for shielding the wires 11 from electromagnetic waves may be separately arranged at the periphery of the wires 11. A preferable example of the shielding material may be a braided member with a structure in which metal wires made of aluminum, stainless steel, copper, an alloy thereof, or the like are braided into a mesh form.

Sheathing Material 21

The sheathing material 21 is flexible and can thus be deformed along the path along which the wires 11 are laid out. The sheathing material 21 covers the wires 11 and thus protects the wires 11. The sheathing material 21 is formed to have a tubular shape that has its longitudinal direction, and the wires 11 are arranged in the space within the sheathing material 21. The sheathing material 21 is preferably made of a resin material in terms of weight reduction, for example. Examples of the resin material may include polyolefin, polyamide, polyester, ABS resin, and the like. Specific examples of the sheathing material 21 may include a corrugated tube, a hard resin pipe, and the like.

The sheathing material 21 according to this embodiment is a corrugated tube, has a structure in which a plurality of ring-shaped recessed portions 22 are arranged in the longitudinal direction thereof, and thus can be readily curved or bent.

The sheathing material 21 may also have a cut line extending in the longitudinal direction. If the sheathing material 21 has a cut line, the wires 11 can be arranged within the sheathing material 21 through the cut line. Note that, if the sheathing material 21 has a cut line, the wires 11 can be prevented from protruding from the cut line by winding a binding material, such as an adhesive tape, around the outer circumference of the sheathing material 21 as needed.

Path-Regulating Member 31

The axial direction of the path-regulating member 31 is parallel to the path along which the wires 11 are laid out. The path-regulating member 31 is arranged so as to partially regulate the path of the wires 11 from the outside of the sheathing material 21. The number of path-regulating members 31 that constitute the wire harness 10 may be one, or may be more than one. That is to say, a plurality of zones of the wires 11 in the wire harness 10 may be regulated by a plurality of path-regulating members 31, or one zone of the wires 11 may be regulated by one path-regulating member 31. The path-regulating member 31 may be constituted by a straight portion only, or may also have a curved portion.

The path-regulating member 31 can be formed through a cutting process in which a pipe-shaped member or a bar-shaped member is cut to a predetermined length, a curving process in which a tubular member or a bar-shaped member is deformed along the path along which the wires 11 are laid out, or the like, for example. The path-regulating member 31 can also be molded in a mold.

The path-regulating member 31 is made of a rigid material capable of maintaining the path of the wires 11 arranged within the sheathing material 21. The path-regulating member 31 is preferably made of a material capable of plastic deformation. A metallic material is preferably used as a material of the path-regulating member 31. Examples of the metallic material may include aluminum, iron, copper, an alloy of these metals, and the like, for example. Note that, if the path-regulating member 31 has a pipe shape, a signal line can also be laid out within the path-regulating member 31, for example.

Clamps

Figure 3:
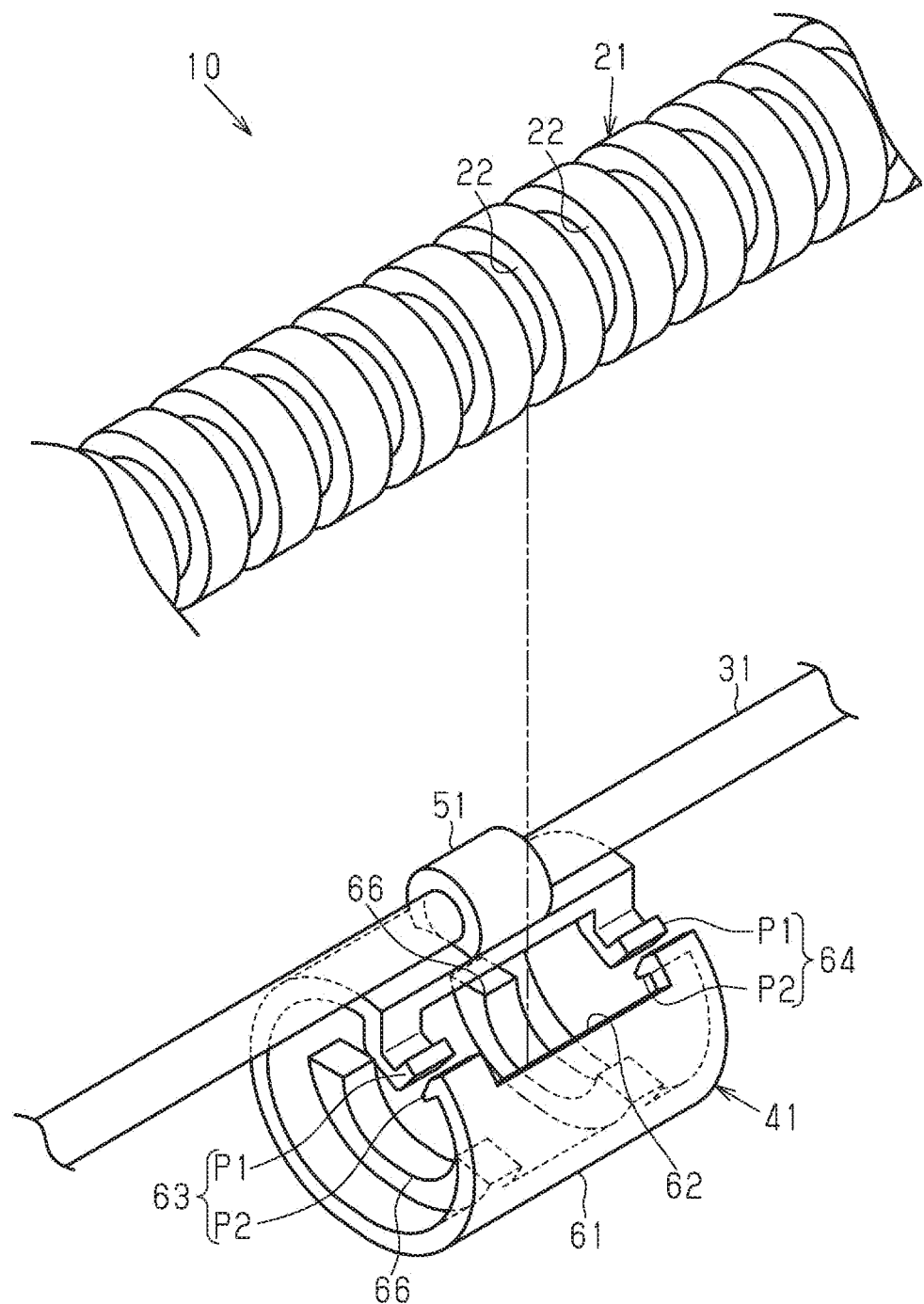
FIG. 3 is a partial perspective view of the wire harness.
Figure 4A:
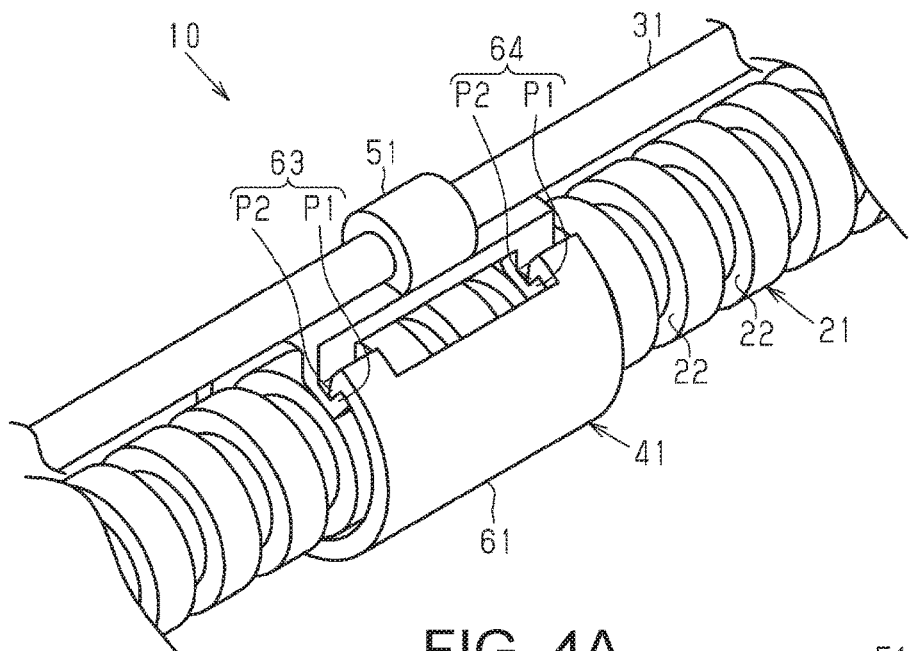
FIG. 4(a) is a partial perspective view of the wire harness.

As shown in FIGS. 3 and 4(a), each of the intermediate clamps 41 has a support portion 51 (support) for supporting the path-regulating member 31, and an attachment portion 61 (attachment) with a ring-shaped structure for attaching the sheathing material 21.

The support portion 51 of each intermediate clamp 41 has a continuous ring-shaped structure, and supports the path-regulating member 31 due to the path-regulating member 31 being inserted into the support portion 51 from an end thereof.

The ring-shaped structure of the attachment portion 61 of each intermediate clamp 41 has an insertion portion 62 (insertion), which enables the sheathing material 21 to be inserted therefrom in the radial direction of the ring-shaped structure. The attachment portion 61 can be deformed into an open orientation (see FIG. 3), in which the sheathing material 21 can be inserted from the insertion portion 62, and a closed orientation (see FIG. 4(b)), in which the ring-shaped structure of the attachment portion 61 forms a continuous ring shape. In the open orientation, the sheathing material 21 can be inserted into the ring-shaped structure of the attachment portion 61 by elastically deforming the insertion portion 62 of the attachment portion 61 such that the insertion portion 62 becomes larger than the outside diameter of the sheathing material 21.

The closed orientation is formed by locking structures (locks). The locking structures include a first locking structure 63 and a second locking structure 64, which are arranged separately from each other in the axial direction of the ring-shaped structure of the attachment portion 61. Each of the first locking structure 63 and the second locking structure 64 according to this embodiment has a structure in which an outward protrusion P1, which protrudes outward of the ring-shaped structure in the radial direction thereof, and an inward protrusion P2, which protrudes inward in the radial direction, are locked at each other.

In each of the intermediate clamps 41, the first locking structure 63, the second locking structure 64, and the support portion 51 are arranged in the order from the first locking structure 63 to the support portion 51, then to the second locking structure 64 in a direction parallel to the axial direction of the ring-shaped structure of the attachment portion 61 (i.e. the axial direction of the sheathing material 21).

Figure 4B:
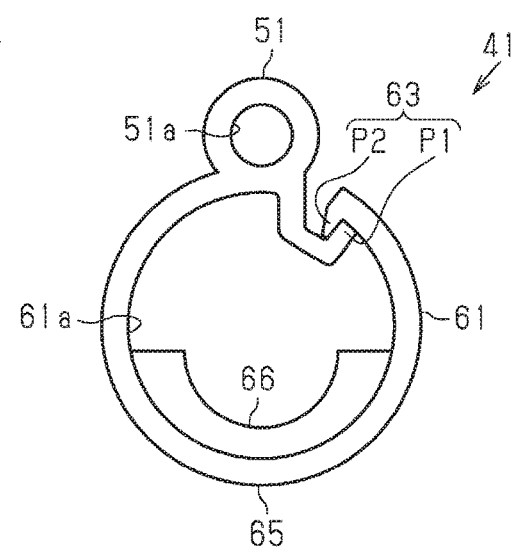
FIG. 4(b) is a side view of a clamp.

As shown in FIG. 4(b), when viewed from the axial direction of the ring-shaped structure of the attachment portion 61 in the closed orientation, the first locking structure 63 is provided at a position biased toward the support portion 51 relative to an outer-circumferential end edge 65 at a position farthest from the support portion 51, in the outer-circumferential edge of the ring-shaped structure of the attachment portion 61 (i.e. the first locking structure 63 is provided at a position close to the support portion 51). That is to say, in the ring-shaped structure of the attachment portion 61, the first locking structure 63 is provided at a position closer to a connecting portion that is connected to the support portion 51, than to the outer-circumferential end edge 65. The second locking structure 64 is also provided at a position biased toward the support portion 51, similarly to the first locking structure 63.

In the example shown in FIG. 4(b), the support portion 51 may have an open hole 51a that allows the path-regulating member 31 to pass through the support portion 51. The attachment portion 61 may have an open hole 61a that allows the sheathing material 21 of the wire harness 10 to pass through the attachment portion 61.

Figure 4C:
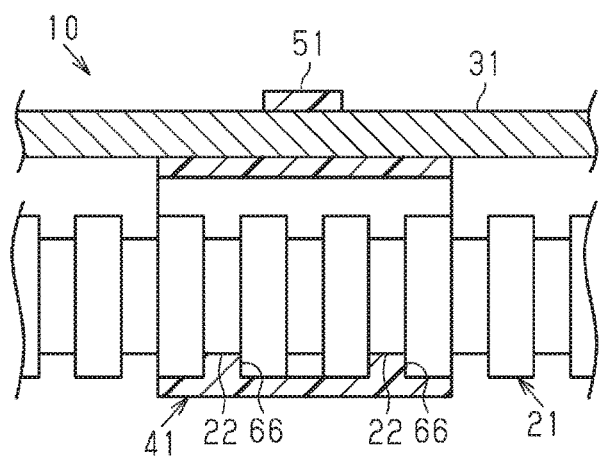
FIG. 4(c) is a partial cross-sectional view of the wire harness.

As shown in FIGS. 3 and 4(c), an inner-circumferential face of the ring-shaped structure of the attachment portion 61 has protruding portions 66, which fit to ring-shaped recessed portions 22 of the sheathing material 21. In this embodiment, a pair of protruding portions 66 is arranged in correspondence with the first locking structure 63 and the second locking structure 64. Note that the number of protruding portions 66 may be more than one, or may be one.

In each of the end clamps 42 shown in FIG. 1, any well-known configuration that may exert the functions of the support portion 51 and the attachment portion 61 may be employed as the configuration of the support portion 51 for supporting the path-regulating member 31 and the configuration of the attachment portion 61 for attaching the sheathing material 21. The support portion 51 of each end clamp 42 preferably has a cap shape that has a wall portion with which an end face of the path-regulating member 31 comes into contact.

Each end clamp 42 also has a fixing portion 71 that is to be fixed to the vehicle 90. The fixing portion 71 has an open hole into which a bolt is to be inserted. Each end clamp 42 can be fixed to the vehicle 90 using a bolt and a nut. The bolt may be welded to the vehicle 90 in advance. Note that the fixing portion 71 of each end clamp 42 may alternatively be a clip that is to be locked to an attachment hole provided in the vehicle 90, for example.

The intermediate clamps 41 and the end clamps 42 may be made of a metallic material or a resin material. The intermediate clamps 41 and the end clamps 42 are preferably made of a resin material in terms of weight reduction, for example. Examples of the resin material may include polyolefin, polyamide, polyester, ABS resin, and the like.

Manufacturing Method

Next, an example of a method for manufacturing the wire harness 10 will be described.

To manufacture the wire harness 10, the support portions 51 of the intermediate clamps 41 and the end clamps 42 are caused to support the path-regulating member 31, and the sheathing material 21 is attached to the support portions 61 of the intermediate clamps 41 and the end clamps 42.

When the sheathing material 21 is attached to the attachment portion 61 of each intermediate clamp 41, the attachment portion 61 of the intermediate clamp 41 is set in the open orientation and is then elastically deformed as shown in FIG. 3, and the sheathing material 21 is inserted from the insertion portion 62. Next, as shown in FIG. 4(a), the attachment portion 61 of the intermediate clamp 41 is changed into the closed orientation using the first locking structure 63 and the second locking structure 64.

Note that the sheathing material 21 may be attached to each of the attachment portions 61 of the intermediate clamps 41 and the end clamps 42 either before or after the path-regulating member 31 is supported by the support portions 51 of the intermediate clamps 41 and the end clamps 42. Also, the wires 11 may be arranged within the sheathing material 21 either before or after the sheathing material 21 is attached to the attachment portions 61 of the intermediate clamps 41 and the end clamps 42.

The thus-obtained wire harness 10 preferably at least includes a pair of end clamps 42 that support two end portions of the path-regulating member 31, and an intermediate clamp 41 provided between the pair of end clamps 42. Note that the path-regulating member 31 can also be fixed to the vehicle 90 using a clamp other than the end clamps 42.

Next, effects of this embodiment will be described.

(1) Each of the intermediate clamps 41 has the support portion 51 for supporting the path-regulating member 31, and the attachment portion 61 with the ring-shaped structure for attaching the sheathing material 21. The attachment portion 61 of each intermediate clamp 41 has the insertion portion 62 that enables the sheathing material 21 to be inserted therefrom in the radial direction of the ring-shaped structure. The attachment portion 61 of each intermediate clamp 41 can be changed between the open orientation, in which the sheathing material 21 can be inserted from the insertion portion 62, and the closed orientation, in which the ring-shaped structure forms a continuous ring shape. The closed orientation is formed by each of the locking structures, which include the first locking structure 63 and the second locking structure 64 that are arranged separately from each other in the axial direction of the ring-shaped structure of the attachment portion 61.

According to this configuration, even if locking at either the first locking structure 63 or the second locking structure 64 is released when the attachment portion 61 of each intermediate clamp 41 is used in the closed orientation with the sheathing material 21 attached thereto, the sheathing material 21 does not withdraw from the attachment portion 61 of the intermediate clamp 41. Accordingly, regulation of the path of the sheathing material 21 using the path-regulating member 31 can be made more reliable.

(2) The sheathing material 21 has the ring-shaped recessed portions 22 in its outer-circumferential face. In each intermediate clamp 41, the inner-circumferential face of the ring-shaped structure of the attachment portion 61 has the protruding portions 66, which fit to the ring-shaped recessed portions 22 of the sheathing material 21. In this case, the sheathing material 21 is restrained from moving in the axial direction thereof relative to the attachment portion 61. Accordingly, the path of the sheathing material 21 is preferably regulated by the path-regulating member 31 that is supported by the support portions 51 of the intermediate clamp 41.

(3) In each intermediate clamp 41, the first locking structure 63 and the second locking structure 64 are provided at positions biased toward the support portion 51 relative to the outer-circumferential end edge 65 at a position farthest from the support portion 51, in the outer-circumferential edge of the ring-shaped structure of the attachment portion 61, when viewed from the axial direction of the ring-shaped structure of the attachment portion 61 in the closed orientation. In this case, for example, it is difficult for other members to be hooked on the first locking structure 63 and the second locking structure 64, and thus, it is difficult for locking at the first locking structure 63 and the second locking structure 64 to be released. Accordingly, regulation of the path of the sheathing material 21 using the path-regulating member 31 can be made more reliable.

(4) The first locking structure 63, the second locking structure 64, and the support portion 51 of each intermediate clamp 41 are arranged in the order from the first locking structure 63 to the support portion 51, then to the second locking structure 64 in a direction parallel to the axial direction of the ring-shaped structure of the attachment portion 61. By thus arranging the first locking structure 63 and the second locking structure 64 of the attachment portion 61 in a well-balanced manner relative to the support portion 51, stress concentration can be reduced when force is applied from the path-regulating member 31 and/or the sheathing material 21 to the intermediate clamp 41, for example.

The above embodiment may also be modified as follows.

The first locking structure 63 and the second locking structure 64 of each intermediate clamp 41 are not limited to locking structures that are locked due to a relationship between the outward protrusion P1 and the inward protrusion P2, and may alternatively be, for example, locking structures that are locked due to a relationship between a protrusion and an open hole. Also, the first locking structure 63 and the second locking structure 64 are not limited to locking structures that are locked in the radial direction of the ring-shaped structure of the attachment portion 61, and may alternatively be locking structures that are locked in the axial direction of the ring-shaped structure.

In each intermediate clamp 41, the positions of the first locking structure 63 and the second locking structure 64 of the ring-shaped structure of the attachment portion 61 are not limited to those in the above embodiment, and the first locking structure 63 and the second locking structure 64 may be provided at, for example, positions biased toward the outer-circumferential end edge 65 of the attachment portion 61 relative to the support portion 51 (i.e. positions close to the outer-circumferential end edge 65), or may be provided at the outer-circumferential end edge 65 of the attachment portion 61.

The first locking structure 63, the second locking structure 64, and the support portion 51 of each intermediate clamp 41 may also be arranged in the order from the support portion 51 to the first locking structure 63, then to the second locking structure 64, for example, in a direction parallel to the axial direction of the ring-shaped structure of the attachment portion 61.

Each intermediate clamp 41 may also have a third locking structure in addition to the first locking structure 63 and the second locking structure 64. That is to say, the closed orientation of the attachment portion 61 of each intermediate clamp 41 may also be formed by three or more locking structures that are separate from each other in the axial direction of the ring-shaped structure of the attachment portion 61.

The protruding portions 66 of the attachment portion 61 of each intermediate clamp 41 may be omitted.

The structure of the support portion 51 of each intermediate clamp 41 is not particularly limited, but can preferably support the path-regulating member 31 due to having a continuous ring shape, as in the above embodiment. Also, the position at which the sheathing material 21 is attached can be readily adjusted by attaching the sheathing material 21 to the attachment portion 61 after supporting, in advance, the path-regulating member 31 using the support portion 51 that has a continuous ring shape, and thus, the wire harness 10 can be manufactured efficiently.

The configuration of the attachment portion 61 of each of the above-described intermediate clamps 41 can also be applied to the attachment portion 61 of each end clamp 42.

The wires 11 in the wire harness 10 may alternatively be low-voltage wires, and portions to be electrically connected by the wire harness 10 may also be changed as appropriate.

The constituent elements in the above embodiment and modifications may also be combined. The sheathing material 21 according to the embodiment is an example of a flexible protective tube. The path-regulating member 31 according to the embodiment is an example of an elongated guide for positioning the sheathing material 21 to a preset layout path. The support portion 51 in the embodiment is an example of a tubular guide grip portion that comes into contact with an outer face of the path-regulating member 31. The attachment portion 61 according to the embodiment is an example of a flexible protective tube holder that receives or holds the flexible protective tube (sheathing material 21). The attachment portion 61 may be an elastic wall portion that allows the flexible protective tube (sheathing material 21) to pass therethrough and forms a second open hole 61a that receives the flexible protective tube (sheathing material 21). This elastic wall portion may have a natural shape in which the elastic wall portion is not elastically deformed, and an elastically deformed shape, which may be an elastically compressed shape. When the elastic wall portion in the natural shape thereof is viewed in the axial direction of the flexible protective tube (sheathing material 21), the elastic wall portion in the natural shape has a non-loop shape (e.g. C shape) with two opposing ends P1 and P2, and a gap (62) is formed between the ends P1 and P2. The elastic wall portion in the elastically deformed shape has a loop shape in which the two opposing ends P1 and P2 are connected to each other, and the gap (62) is cancelled.

The present disclosure encompasses the following implementation examples. The reference numerals of the constituent elements in the embodiment are given, not for the purpose of limitation but to help understanding.

[Note 1] Some implementation examples provide a clamp (41) that is used together with an elongated guide (31) arranged along at least a portion of a layout path, which is preset in a vehicle (90), to position a flexible protective tube (21) for protecting wires (11) in a wire harness (10). This clamp (41) includes:

a tubular guide grip portion (51) that comes into contact with an outer face of the elongated guide (31) to attach the clamp (41) to the elongated guide (31), the tubular guide grip portion (51) having a first open hole (51a) that allows the elongated guide (31) to pass therethrough; and an elastic wall portion (61) configured to receive a portion of the flexible protective tube (21) to bring the flexible protective tube (21) close to the elongated guide (31), and to form a second open hole (61a) that restricts a largest separation distance between the portion of the flexible protective tube (21) and the elongated guide (31), wherein the elastic wall portion (61) can be switched between a loop shape that enables the elastic wall portion (61) to continuously surround the entire periphery of the flexible protective tube (21) when viewed from an axial direction of the elastic wall portion (61), and a non-loop shape demarcating a gap (62) that allows the flexible protective tube (21) to pass through the elastic wall portion (61) in the radial direction thereof when viewed from the axial direction of the elastic wall portion (61), the elastic wall portion (61) with the non-loop shape has a first end (P1) and a second end (P2) that opposes each other and forms the gap (62), and the first end (P1) and the second end (P2) of the elastic wall portion (61) are configured to engage with each other so as to prevent the elastic wall portion (61) from being elastically deformed from the loop shape to the non-loop shape.

[Note 2] In some implementation examples, the clamp (41) is configured as a one-piece item.

[Note 3] In some implementation examples, the non-loop shape of the elastic wall portion (61) is a natural shape of the elastic wall portion (61), and the loop shape of the elastic wall portion (61) is an elastically deformed shape of the elastic wall portion (61).

[Note 4] In some implementation examples, the first end (P1) and the second end (P2) of the elastic wall portion (61) are configured as hooks. [Note 5] In some implementation examples, the first end (P1) and the second end (P2) of the elastic wall portion (61) are snap-fits.

[Note 6] In some implementation examples, the second open hole (61a) in the elastic wall portion (61) is parallel to the first open hole (51a) in the tubular guide grip portion (51).

[Note 7] In some implementation examples, if the elastic wall portion (61) is measured in the axial direction of the flexible protective tube (sheathing material 21), the elastic wall portion (61) is longer than the tubular guide grip portion (51).

It will be apparent for a person skilled in the art that the present disclosure may also be embodied in other unique modes without departing from the technical idea thereof. For example, some of the components described in the embodiment (or one or more modes thereof) may be omitted, or may be combined.

The invention claimed is:

1. A clamp that is to be used as a constituent member of a wire harness, the wire harness including wires, a sheathing material that is flexible and covers the wires, and a path regulator for regulating a path along which the wires are laid out from outside the sheathing material, the path regulator having an axial direction parallel to the path along which the wires are laid out, the clamp comprising:

a support for supporting any one portion of the path regulator; and an attachment with a ring-shaped structure for attaching the sheathing material, wherein the attachment has an insertion that enables the sheathing material to be inserted therefrom in a radial direction of the ring-shaped structure, the attachment can be changed between an open orientation that enables the sheathing material to be inserted from the insertion, and a closed orientation that makes the ring-shaped structure into a continuous ring shape, the clamp is provided with locks configured to keep the attachment in the closed orientation, the lock including a first lock and a second lock that are arranged separately from each other in an axial direction of the ring-shaped structure, and the clamp is configured as a one-piece item, the support has a first open hole that allows the path regulator to pass therethrough, the attachment is configured to form, when being in the closed orientation, a second open hole that receives a portion of the sheathing material to bring the sheathing material close to the path regulator, and that restricts a largest separation distance between the portion of the sheathing material and the path regulator, and the second open hole in the attachment is separate from the first open hole in the support in a direction intersecting the axial direction.

2. The clamp according to claim 1, wherein the sheathing material has a ring-shaped recess in an outer-circumferential face thereof, and an inner-circumferential face of the ring-shaped structure of the attachment has a protrusion that is to be fitted to the ring-shaped recess of the sheathing material.

3. The clamp according to claim 1, wherein the first lock and the second lock are provided at positions biased toward the support relative to an outer-circumferential end edge located at a position farthest from the support, in an outer-circumferential edge of the ring-shaped structure of the attachment, when viewed from the axial direction of the ring-shaped structure of the attachment in the closed orientation.

4. The clamp according to claim 1, wherein the first lock, the support and the second lock are arranged, in that order, in a direction parallel to the axial direction of the ring-shaped structure of the attachment.

5. A wire harness comprising:

wires;

a sheathing material that is flexible and covers the wires;

a path regulator for regulating a path along which the wires are laid out from outside the path regulator having an axial direction parallel to the path along which the wires are laid out; and a clamp having a support for supporting any one portion of the path regulator, and an attachment with a ring-shaped structure for attaching the sheathing material, wherein the attachment of the clamp has an insertion that enables the sheathing material to be inserted therefrom in a radial direction of the ring-shaped structure, the attachment can be changed between an open orientation that enables the sheathing material to be inserted from the insertion, and a closed orientation that makes the ring-shaped structure into a continuous ring shape, the clamp is provided with locks configured to keep the attachment in the closed orientation, the locks including a first lock and a second lock that are arranged separately from each other in an axial direction of the ring-shaped structure, and the clamp is configured as a one-piece item, the support has a first open hole that allows the path regulator to pass therethrough, the attachment is configured to form, when being in the closed orientation, a second open hole that receives a portion of the sheathing material to bring the sheathing material close to the path regulator, and that restricts a largest separation distance between the portion of the sheathing material and the path regulator, and the second open hole in the attachment is separate from the first open hole in the support in a direction intersecting the axial direction.

\* \* \* \* \*